Patented Apr. 28, 1925.

1,536,012

UNITED STATES PATENT OFFICE.

OMAR T. JOSLIN, OF CINCINNATI, OHIO.

PRODUCT PRODUCED FROM SULPHONIC ACIDS AND PROTEIDS AND PROCESS OF MAKING.

No Drawing. Application filed February 23, 1923. Serial No. 620,844.

*To all whom it may concern:*

Be it known that I, OMAR T. JOSLIN, a citizen of the United States, and residing at Cincinnati, in the county of Hamilton and State of Ohio, have invented a new and useful Improvement in Products Produced from Sulphonic Acids and Proteids and Processes of Making, of which the following specification is a full disclosure.

My invention relates to a new chemical body or bodies having certain unique and useful properties, and to the process for producing the same.

The object of my invention is to produce a new body in the nature of a magma that will combine both high absorptive and high tenacity properties, which will be insoluble in water and not readily decomposable I have discovered that such a body may be produced by combining water solutions of proteids, such as glue, gelatine, casein or the like, which are at least feebly soluble in water, with sulphonic acids, both being bodies of very high molecular weight and the combination of which produce a new compound of high but indefinite molecular weight having the properties described.

I have obtained the best results from sulphonic acids produced by the sulphonation of portions of the contents of mineral oil, and which have molecular weight ranging from 350 to 500, though I do not desire to be limited to this particular species or to the particular origin or source of the sulphonic acid.

A water solution of sulphonic acid will precipitate out of a water solution of a suitable proteid this new water insoluble magma.

I have found that it requires about 40 cubic centimeters of a 10% water solution of sulphuric acid to coagulate 60 cubic centimeters of pure glue solution of approximately 10% strength.

The proteids such as glue or gelatine have very high tenacity or adhesive properties, and very little absorptive or retentive power; conversely, the sulphonic acids have a very high degree of absorptive or retentive property but a low tenacity, whilst the bodies formed by this new combination combine these properties and therefore produce a body which will absorb and hold indefinitely, a relatively large per cent of glycerin, modified starch, oils, such as tung, castor, or linseed, mineral oils, solution of rubber in benzol, or shellac in alcohol solutions, each of which gives a new and different product, each of which has peculiar and various properties.

While it is impossible to forecast all the utilities rendered available by this new magma, it will be readily seen that very desirable filling materials can be produced for impregnating fabrics or the like; that various superior glue bodies can be produced or rubber compositions, all of which will be water insoluble.

I have discovered that this new magma, while insoluble in water, is readily soluble in strong acetic acid, from which solution it could be regenerated by the addition of water. At the same time, the magma is insoluble in fairly strong mineral acids and is not readily decomposable. It is homogeneous and instantly precipitates out when the water solutions of glue and sulphonic acid are thrown together, indicating a true and prompt chemical combination, but it is impossible to give a definite formula as this would vary infinitely with the species.

I have discovered that when this glue solution completely neutralized the sulphonic acid, leaving only the free sulphuric acid in the clear liquor, the slightly acid liquor was readily separated from the coagulated mass by kneading, leaving the magma to quite homogeneous and putty-like consistency. This product contained about 50% of water and the dried product showed 12% ammonia ($NH_3$). As the original glue contained about 20% $NH_3$, there was indicated a combination of two parts sulphonic acid to three of glue.

This magma provides a new vehicle for the incorporation of any substances suitable to coatings, fillings, bindings, and many other like usages where a glue characteristic is required or where water insolubility is desired.

When the proteid and sulphonic water solutions are mixed together and stirred, the precipitate forms as a soft, gummy coagulant, which gradually thickens, as the particles are gathered together and manipulated to separate out the fluid content, the density and gummy consistency of the mass increasing, until it becomes a ponderable, putty-like body which can be removed. Probably this body contains about fifty per cent water at this stage, which can be worked out if desired, to any desired density. This body dries to a crisp, or crusting solid, and if the material be spread upon fabric or paper, it tenaciously adheres, appearing as a film in the dry state, if spread sufficiently thinly.

I have found that one desirable method of incorporating the desired material, such as a rubber solution, or oils, is to mix the same with the solutions of proteids and sulphonic acid, and then as the precipitate forms in globules which gradually mass into a body, the material to be impregnated is picked up during the stage of precipitation, and will be uniformly incorporated in the magma and retained, in a homogeneous body having characteristics dominated by the property of the selected material.

I have also secured similar reactions from aromatic stearo-sulphonic acid, and do not desire to be limited to the particular species employed but prefer those of relatively high molecular weight.

In fact, that the gelatine acts as a base is indicated by a modified form of process as follows:

Instead of using the sulphonic acid direct, solutions of sulphonic soap can be mixed with the proteid solution and mineral or strong organic acid added to break up the soap and liberate the sulphonic acid which will then act upon the gelatine as a base and form the magma precipitate.

In some instances, it may be desirable to reconstitute the sulphonic acid from the salt in the presence of the proteid solution.

I have also found that the sulphonic acid need not be entirely pure, for instance, if mineral oil sulphonic acid be employed, the reaction will not be unfavorably affected by the presence of mineral oil admixed with the sulphonic acid.

The discovery, I believe, is broadly new and valuable, and I do not desire to be limited to the details of the process or to the specific product, to the genus of which the invention relates.

Having described my invention, I claim:

1. A magma formed by the combination of proteid bodies with sulphonic acid, consisting of a putty-like, homogeneous body substantially insoluble in water, not readily decomposable, and combining a high tenacity with a high retentive property.

2. A magma formed by the combination of proteid bodies with sulphonic acid.

3. A new product formed by the combination of proteids with sulphonic acid characterized by high degree of tenacity and absorption, water insoluble, not readily decomposable, but soluble in acetic acid solution from which the magma may be precipitated by the addition of water.

4. The herein described process of forming a magma which consists in bringing together water solutions of proteid bodies and sulphonic acid, and separating out the precipitate from the liquid.

5. The herein described process of forming a new magma which consists in combining proteids with sulphonic acids, both bodies being of relatively high molecular weight.

6. The herein described process consisting in neutralizing glue liquors with sulphonic acid and separating out the precipitate.

7. A body formed by the combination of a proteid with sulphonic acid, water insoluble, having high absorbent and retention properties, constituting a magma, adapted to be dried into a solid state, and having the property of absorbing different materials to form a product having characteristics dominated by the material selected for incorporation into the magma.

In witness whereof, I hereunto subscribe my name, as attested by the two subscribing witnesses.

GRANT L. HOUSTEAU.

Witnesses:
R. KISTNER,
L. A. BECK.

putty-like body which can be removed. Probably this body contains about fifty per cent water at this stage, which can be worked out if desired, to any desired density. This body dries to a crisp, or crusting solid, and if the material be spread upon fabric or paper, it tenaciously adheres, appearing as a film in the dry state, if spread sufficiently thinly.

I have found that one desirable method of incorporating the desired material, such as a rubber solution, or oils, is to mix the same with the solutions of proteids and sulphonic acid, and then as the precipitate forms in globules which gradually mass into a body, the material to be impregnated is picked up during the stage of precipitation, and will be uniformly incorporated in the magma and retained, in a homogeneous body having characteristics dominated by the property of the selected material.

I have also secured similar reactions from aromatic stearo-sulphonic acid, and do not desire to be limited to the particular species employed but prefer those of relatively high molecular weight.

In fact, that the gelatine acts as a base is indicated by a modified form of process as follows:

Instead of using the sulphonic acid direct, solutions of sulphonic soap can be mixed with the proteid solution and mineral or strong organic acid added to break up the soap and liberate the sulphonic acid which will then act upon the gelatine as a base and form the magma precipitate.

In some instances, it may be desirable to reconstitute the sulphonic acid from the salt in the presence of the proteid solution.

I have also found that the sulphonic acid need not be entirely pure, for instance, if mineral oil sulphonic acid be employed, the reaction will not be unfavorably affected by the presence of mineral oil admixed with the sulphonic acid.

The discovery, I believe, is broadly new and valuable, and I do not desire to be limited to the details of the process or to the specific product, to the genus of which the invention relates.

Having described my invention, I claim:

1. A magma formed by the combination of proteid bodies with sulphonic acid, consisting of a putty-like, homogeneous body substantially insoluble in water, not readily decomposable, and combining a high tenacity with a high retentive property.

2. A magma formed by the combination of proteid bodies with sulphonic acid.

3. A new product formed by the combination of proteids with sulphonic acid characterized by high degree of tenacity and absorption, water insoluble, not readily decomposable, but soluble in acetic acid solution from which the magma may be precipitated by the addition of water.

4. The herein described process of forming a magma which consists in bringing together water solutions of proteid bodies and sulphonic acid, and separating out the precipitate from the liquid.

5. The herein described process of forming a new magma which consists in combining proteids with sulphonic acids, both bodies being of relatively high molecular weight.

6. The herein described process consisting in neutralizing glue liquors with sulphonic acid and separating out the precipitate.

7. A body formed by the combination of a proteid with sulphonic acid, water insoluble, having high absorbent and retention properties, constituting a magma, adapted to be dried into a solid state, and having the property of absorbing different materials to form a product having characteristics dominated by the material selected for incorporation into the magma.

In witness whereof, I hereunto subscribe my name, as attested by the two subscribing witnesses.

GRANT L. HOUSTEAU.

Witnesses:
R. KISTNER,
L. A. BECK.

Certificate of Correction.

It is hereby certified that the signature of the patentee at the end of the printed specification in Letters Patent No. 1,536,012, granted April 28, 1925, upon the application of Omar T. Joslin, of Cincinnati, Ohio, for an improvement in "Products Produced from Sulphonic Acids and Proteids and Processes of Making," was erroneously printed as "Grant L. Housteau," where as said signature should have been printed as *Omar T. Joslin;* and that the said Letters Patent should be read with this correction therein that the same may conform to the record of the case in the Patent Office.

Signed and sealed this 26th day of May, A. D. 1925.

[SEAL.]

KARL FENNING,
*Acting Commissioner of Patents.*

Certificate of Correction.

It is hereby certified that the signature of the patentee at the end of the printed specification in Letters Patent No. 1,536,012, granted April 28, 1925, upon the application of Omar T. Joslin, of Cincinnati, Ohio, for an improvement in " Products Produced from Sulphonic Acids and Proteids and Processes of Making," was erroneously printed as " Grant L. Housteau," where as said signature should have been printed as *Omar T. Joslin;* and that the said Letters Patent should be read with this correction therein that the same may conform to the record of the case in the Patent Office.

Signed and sealed this 26th day of May, A. D. 1925.

[SEAL.]

KARL FENNING,
*Acting Commissioner of Patents.*